Patented Apr. 1, 1941

2,236,911

UNITED STATES PATENT OFFICE 2,236,911

COATED GLASS ARTICLES AND A METHOD OF MANUFACTURING THE SAME

Bernard Long, Paris, France, assignor to Societe Anonyme des Manufactures des Glaces & Produits Chimiques de Saint-Gobain, Chauny & Cirey, Paris, France No Drawing. Application July 2, 1934, Serial No. 733,454. In France July 17, 1933

2 Claims. (Cl. 49—81)

This invention relates to glass, glassy articles and/or articles having glass surfaces, and refers more particularly to the application of metals, alloys, or metallic oxydes onto glass surfaces.

Mirrors and other coated glass articles are often manufactured by depositing or projecting particles of metal-containing substances onto glass surfaces. The term "metal-containing substances" is used throughout the specification to indicate metals, alloys and metallic oxides. It is customary to heat these surfaces before applying the metallic particles, since the particles adhere much better to hot surfaces than to cold ones. It was found, however, that many glass articles crack or break in the course of the coating, and that such breakage is caused by the preliminary heating which results in a considerable difference in temperature between those parts of the glass which are to be provided with a metallic coating and other parts of the same glass article.

An object of the present invention is the provision of a safe and inexpensive method of coating a glass surface.

Another object is the provision of a heat-resisting, coated glass article.

The above and other objects of this invention may be realized by tempering or hardening the glass before projecting particles of metal-containing substances onto at least some of the surfaces of said glass.

This tempering or hardening of a glass body or surface results in an increase of its resistivity against inner forces developed within the glass while it is heated and tending to crack the same.

Therefore, in accordance with the present invention, the glass is first tempered or hardened; and the metallic particles are projected onto the surfaces of the glass to be coated with metal containing substances, when said surfaces are at a sufficiently high temperature.

The glass bodies should be heated to a temperature which is close to that at which the glass begins to get soft. Then the heated glass is rapidly and suddenly cooled. It is advisable to cool the glass to a temperature which lies between 400° C. and 200° C.; this temperature being lower than the range of temperatures, different for each type of glass, at which the inner forces are likely to be developed within the glass in the course of its manufacture.

The glass which has been rapidly cooled from its softening temperature to this lower temperature becomes hardened. Then the metal-containing particles are projected onto the glass surfaces, preferably, when these surfaces are at the above-mentioned lower temperature.

The surfaces of a hardened glass to be coated with metal containing substances may also be reheated to that lower temperature.

The described method may be used for the coating of glass sheets or glass plates on any desired thickness; the glass surface may be polished or raw. The metallic coating will adhere very closely to the glass surface and will be distributed evenly and smoothly.

What is claimed is:

1. As a new article of manufacture, a tempered glass article, at least a part of a surface of said tempered glass article carrying a coating consisting of conglomerated solidified molten metal particles.

2. The method of coating a glass article with a metallic substance, said method comprising the step of depositing the metallic substance upon at least a part of a surface of the glass article while the glass article is in a tempered state and while the temperature of the glass article ranges between 400° C. and 200° C.

BERNARD LONG.